United States Patent [19]

Sherratt

[11] 3,774,378

[45] Nov. 27, 1973

[54] METHOD OF DISLODGING DEAD GRASS FROM A LAWN

[75] Inventor: Jack Sherratt, Edmonton, Alberta, Canada

[73] Assignee: Arthur Mihalcheon, Edmonton, Alberta, Canada

[22] Filed: June 26, 1970

[21] Appl. No.: 59,863

Related U.S. Application Data

[60] Division of Ser. No. 886,341, Dec. 18, 1969, which is a continuation-in-part of Ser. No. 786,486, Nov. 15, 1968, abandoned.

[52] U.S. Cl. ................................... 56/1, 56/DIG. 2
[51] Int. Cl. ............................................ A01d 77/06
[58] Field of Search .................. 56/295, 16.4–16.6, 56/DIG. 2, 370, 377, 16.9, 16.7; 172/111

[56] References Cited
UNITED STATES PATENTS

| | | | |
|---|---|---|---|
| 3,015,929 | 1/1962 | Bright | 56/295 X |
| 3,117,633 | 1/1964 | Hosek | 56/295 X |
| 2,720,071 | 10/1955 | Watanabe | 56/16.6 |
| 3,509,707 | 5/1970 | Stampfer | 56/370 |
| 2,712,212 | 7/1955 | Sears | 172/111 X |

FOREIGN PATENTS OR APPLICATIONS

| | | | |
|---|---|---|---|
| 940,754 | 10/1963 | Great Britain | 56/377 |

Primary Examiner—Louis G. Mancene
Assistant Examiner—J. N. Eskovitz
Attorney—Edwards et al.

[57] ABSTRACT

An attachment for use with a household-type rotary power lawn mower having a vertical spindle. A bar is horizontally mounted on the spindle. One or two coil spring tines are mounted on the bar at each end. The tooth of each tine extends downwardly so that its tip is at ground surface. The high speed rotation of the tines over the ground along with the movement of the machine along the ground results in the tines scrubbing dead grass out of a lawn without otherwise seriously damaging the live grass.

3 Claims, 8 Drawing Figures

Patented Nov. 27, 1973
3,774,378
3 Sheets-Sheet 1
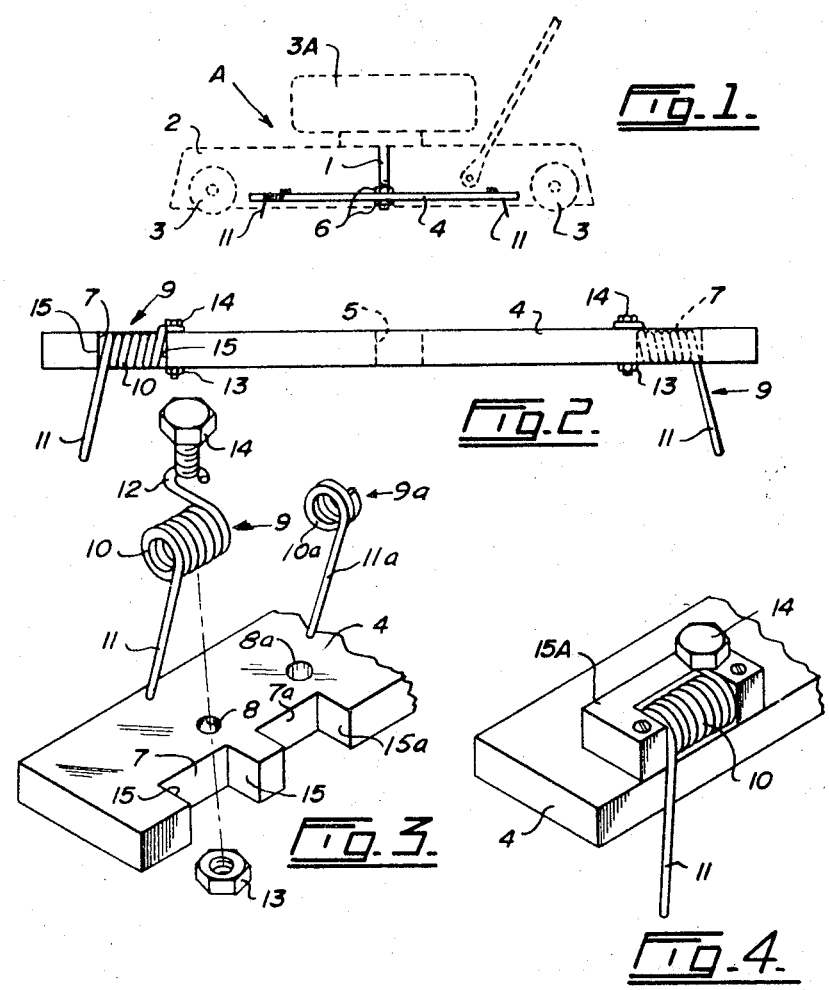
INVENTOR
JACK SHERRATT
BY
ATTORNEY

METHOD OF DISLODGING DEAD GRASS FROM A LAWN

This application is a division of Ser. No. 886,341, filed Dec. 18, 1969, which is a continuation-in-part of my application for U.S. Letters Patent Ser. No. 786,486 filed Nov. 15, 1968, for "POWERED GRASS RAKING DEVICE," and now abandoned.

This invention relates to a grass raking attachment for use with a household-type, rotary power lawn mower.

If a grass lawn is exposed to severe winter conditions, a substantial proportion of the grass will die. In the spring, this matted dead grass has to be removed; otherwise, the lawn will not grow well. In the past, such removal has involved scrubbing the lawn by hand with a heavy rake. This is a laborious job.

In accordance with this invention, it is proposed to combine coil spring tines or raking teeth with a high-speed, household-type, rotary power lawn mower. This combination provides a mechanical raker which is suitable for scrubbing dead grass from lawns without seriously affecting the remaining live grass.

Now, it is known to use spring tines in hay rakes to gather loose straw into a windrow. It is also known to mount a large number of spring tines on the blade of a rotary power mower to provide a mechanical mulcher (see U.S. Pat. No. 3,117,633, issued to Hoseck.)

However, these prior art devices will not operate successfully to scrub a lawn of dead grass. In the case of the mulcher, it uses a substantial number of spring tines. The specification shows five or more tines at each end of the blade. If such a mulcher is used to scrub a lawn, substantially all the grass, both live and dead, will be removed. Additionally, the machine will constantly stall.

It is one object of this invention to provide an attachment, adapted to be used with a high-speed, conventional rotary power lawn mower, for raking or scrubbing dead grass out of a lawn without damaging the live grass.

Another object of this invention is the mounting of raking teeth on a support member to provide a suitable grass raking attachment device adapted to be rotated by the vertical spindle shaft of a rotary power mower.

Another object is to provide easily replaceable raking teeth which are resilient and capable of withstanding severe stressing.

Another object is to provide a support member which is constructed so as to support the raking teeth in a manner which will prolong their useful life.

Still another object is to provide a grass raking attachment for use with a power mower which may be inexpensively and easily manufactured.

Other objects and a fuller understanding of the invention may be had by referring to the following description and claims, taken in conjunction with the accompanying drawings in which:

FIG. 1 is a side elevational view of the device mounted in grass-raking position on a conventional rotary power mower;

FIG. 2 is a side plan view of one embodiment of the device;

FIG. 3 is an enlarged isometric view of one end of the device ready for assembly;

FIG. 4 is an isometric view of an embodiment of the invention; and

Figure 5:
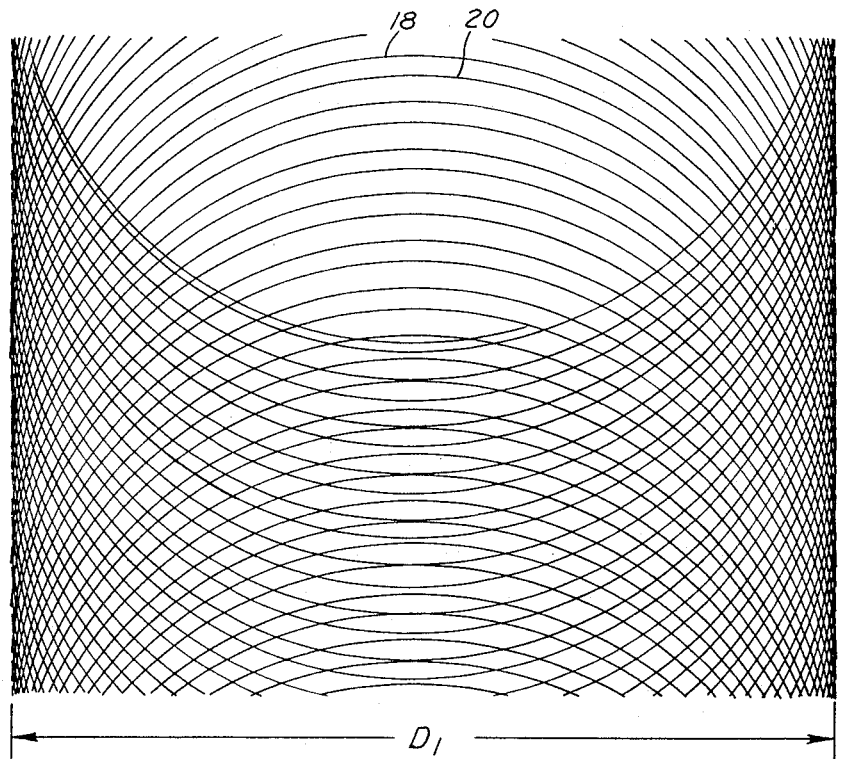
FIGS. 5, 6, 7 and 8 are simulations of the paths traced by a device according to the invention having one, two, three and five vertically positioned tines respectively on each end of the rotating bar as the center of rotation is moved along over the surface of the ground.

With reference to the drawings, the invention is illustrated as being mounted on the vertical spindle shaft 1 of a rotary power mower indicated generally by the reference character A. The mower A includes a chassis 2 mounted on wheels 3 and power means 3A, such as a gasoline engine, mounted on the chassis 2 and operatively connected for rotating the spindle shaft 1.

A support member 4, illustrated in preferred form in FIGS. 2 and 3 as a flat bar, is horizontally, removably mounted on the lower end of the spindle shaft 1. The support member 4 is provided with an opening 5 at its longitudinal center point for mating snugly with the spindle shaft 1. As illustrated, the lower end of the spindle shaft 1 is threaded and lock nuts 6 are used to secure the support member 4 in place.

Slots 7 are provided adjacent the ends of the support member 4. The slots 7 may conveniently be located at the trailing edge of the support member 4. Bolt holes 8 are provided adjacent the inner edges of the slots 7 for mounting purposes, as explained hereinbelow.

Raking teeth 9 are disposed in the slots 7 and mounted on the support member 4. As best shown in FIG. 3, each raking tooth 9 comprises a horizontal coil member 10, a downwardly depending tooth member 11 connected to the coil member 10 at its outer end and a horizontal hook member 12 connected to the coil member 10 at its inner end. The coil member 10, tooth member 11 and hook member 12 form an integral unit. The hook member 12 is adapted to circumscribe the adjacent bolt hole 8 when the coil member 10 is disposed within the slot 7. Nut 13 and bolt 14 cooperate with the hook member 12 to secure the raking teeth 9 in place. Additional teeth 9a may be positioned in slots 7a provided as required and held in place by bolt 14a and nut 13a received in hole 8a and cooperating with coil member 10a to position tooth member 11a.

As illustrated, the tooth member 11 may be bent to a trailing position at a slight angle from vertical.

The horizontally disposed coil member 10 is dimensioned to fit snugly within the slot 7. In accordance with this construction, the shoulders 15 of the slot 7 prevent axial elongation of the coil member 10. It is anticipated that other means, such as the built-up shoulders 15a illustrated in FIG. 5, may be used to serve the same function.

It has been found that only up to two raking teeth 9 can be used at each end of support member 4. One raking tooth at each end is preferred.

If a number of teeth, such as five, four, or even three, are mounted at each end, it will be found that the lawn is badly damaged. The dead grass and a very substantial proportion of the live grass is pulled out. In fact, trials with three and four teeth at each end have literally scalped a lawn surface.

If only one tooth is used, it will trace a series of closely spaced circular paths with no substantial amount of overlapping and root out most of the dead grass. The live grass apparently bends away from the tooth and serious damage does not occur. When two teeth are used, there is greater overlapping and the results are not as good, however, they are acceptable.

If more than two teeth are used, the overlapping is excessive and the device is inoperative for the intended purpose, that is removing the dead grass without seriously damaging the live grass.

It will be appreciated that the amount of overlap is a function of the speed of rotation of the device and also a function of the speed of the movement of the device over the ground. The normal speed of the movement of the device over the ground will vary with the individual, but it will generally fall between one and two miles per hour which converts to between 88 ft/min. and 176 ft/min. The speed of rotation of the device will vary slightly but has been found to be generally on the order of about 3000 rpm. With a self-propelled rotary mower the faster the rotation of the device the greater the translation speed over the ground.

In FIGS. 5, 6, 7 and 8 there are shown traces made by a device simulating the device of this invention. The traces were made by means of a vertical milling machine equipped with a fly-cutter. The rotational speed of the tool was set at 60 rpm and the horizontal speed of the table was set at 25 inches per minute. The diameter of the fly-cutter was 6 inches. This set up simulated a trace of a single tooth on a bar 4 of 12 inches in length turning at about 3000 rpm and travelling forward at about 100 ft/min. To simulate having a tooth at each end of the bar, a second cut was inscribed with the fly-cutter with the starting point for the second cut being 180° out of phase with the first cut. The combined first and second cuts form FIG. 5.

Figure 6:
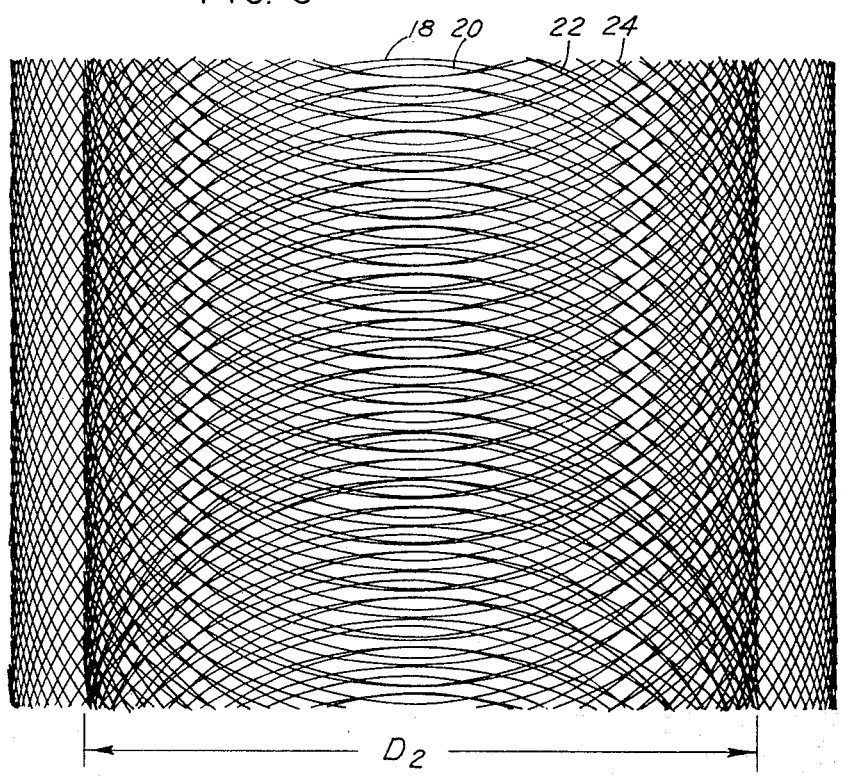

FIG. 6 simulates the traces of a device according to the invention wherein there are two tines on each end of the bar. To accomplish this further, cuts were made with the fly-cutter set at 5½ inches and a second cut made at this setting 180° out-of-phase with the first.

Figure 7:
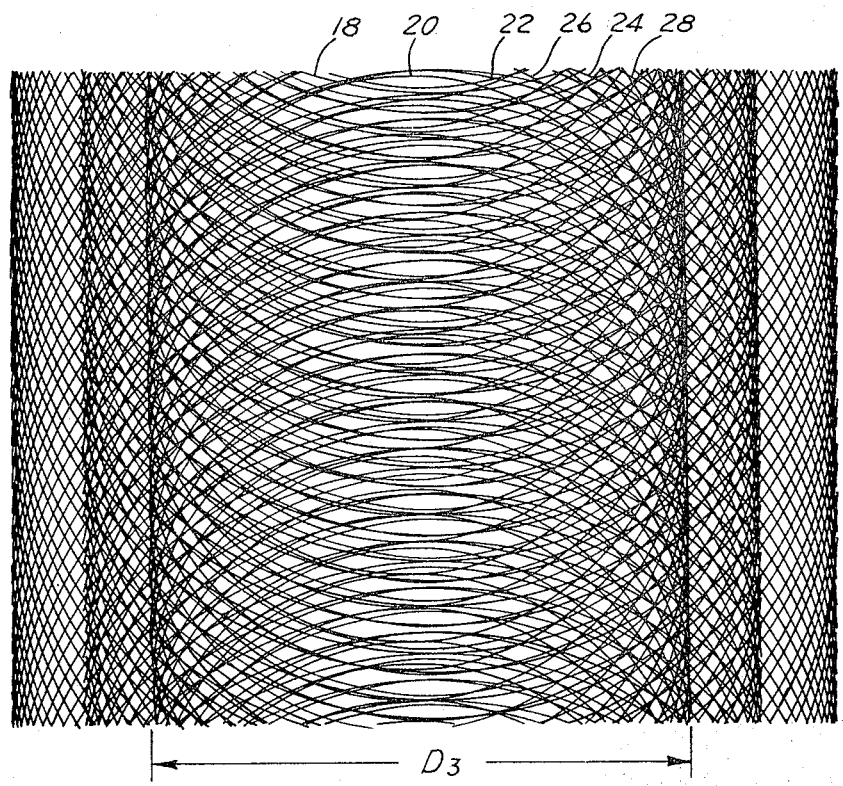
Figure 8:
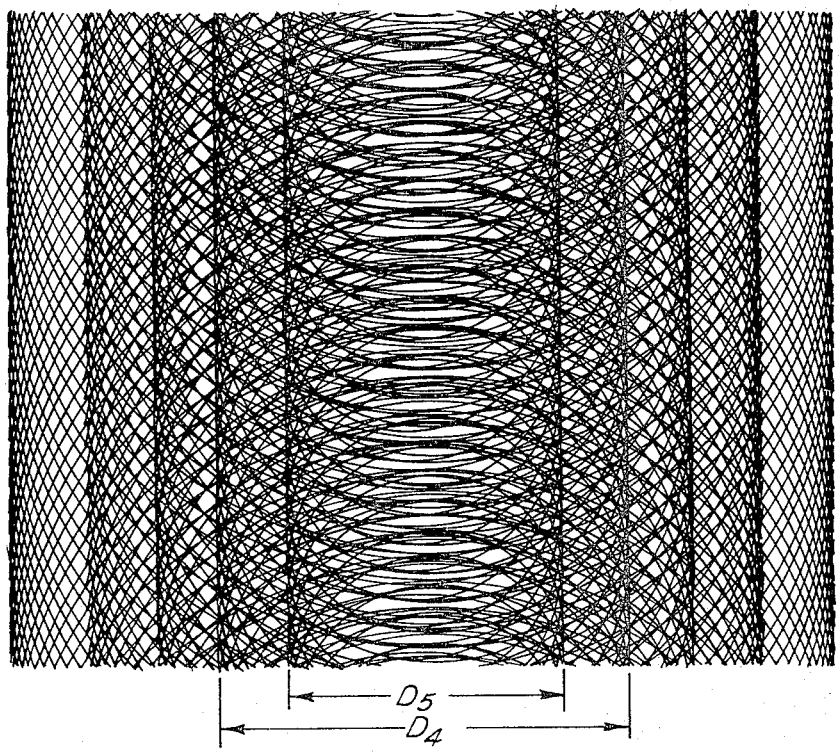

A third set of cuts were made to give the traces of FIG. 7 wherein the fly-cutter was set at 5 inches to simulate three times on each end and FIG. 8 resulted from additional cuts being made at both 4½ and 4 inch settings to simulate five times on each end of bar 4.

It is readily seen that there is substantially no overlapping of the traces in FIG. 5 which represents one time on each end of the bar. Very little overlapping of the traces appears in FIG. 6 which represents two times on each end of the bar. On the other hand, the traces of FIGS. 7 and 8 show more overlapping than can be tolerated by the live grass without being uprooted and the lawn scalped and destroyed. Thus, it is the purpose of the invention to provide a means and a method of contacting a plurality of vertically positioned tines on the ends of a bar with a lawn while the bar is being rotated about a mid-point as the mid-point or center of rotation is moved across the line such that the tines follow helical paths in traversing the lawn while substantially avoiding overlap of the paths.

Referring to FIG. 5, trace 18 represents the path scribed by one tine 11 positioned at one end of bar 4 and trace 20 represents the trace of tine 11 positioned at the other end of bar 4. The spacing between the two tines is D1. The only overlap of tine paths in FIG. 5 is seen to be at each edge of the pattern where the paths are tangent to a pair of lines parallel to the direction of movement and spaced at a distance D1.

Referring now to FIG. 6, again traces 18 and 20 represent the paths of the tines 11 at each end of bar 4. Traces 22 and 24 represent the paths of tines 11a, spaced radially inwardly from tines 11 within slots 7a, FIG. 3, and fastened to bar 4 by means of bolts 14a in the same manner as tines 11. The spacing between tines 11a is seen to be the distance D2. Again, the overlap of pths is seen to exist primarily where the paths are tangent to a pair of lines parallel to the direction of travel spaced by the distance D1 and another pair of lines spaced by the distance D2.

Referring now to FIG. 7, there is represented the paths of tines mounted on the ends of a rotating bar in radially spaced relation at distances D1, D2 and D3 with D1>D2>D3 and producing traces 18, 20, 22, 24, 26 and 28. There is overlap along lines spaced at distances D1, D2 and D3 as well as substantial overlap of traces throughout the pattern.

In FIG. 8, in addition to tines spaced at distances D1, D2 and D3 tines are mounted on bar 4 and positioned at distances D4 and D5. The overlap of the traces is very substantial not only along the lines spaced at distances D1, D2, D3, D4 and D5, but also throughout the pattern.

As has been found from actual tests the use of a bar having more than two radially spaced tines at each end results in essentially scalping of the lawn by the tearing out of the live as well as the dead grass. It will be appreciated that the tines each trace out a helix, the diameter of which is twice the radial displacement of the tine from the center of rotation and the pitch is a function of the lateral speed of traversal over a surface. Each tine spaced the same distance from the center of rotation will produce a pair of lines of overlapping traces spaced apart in parallel relation by thrice the radial distance from the center of rotation and paralleling the direction of traverse movement of the tines over a surface.

The preferred embodiment of the invention utilizes a raking tooth 9 having a horizontal coil member 10 and a support member 4 defining slots 7 which support the said coil member 10 preventing its axial elongation. However, it will be appreciated that the coil member 10 may be disposed in a position other than horizontal and may be attached to the support member 4 without being fitted into slots 7 defined by the said support member 4.

It is important that the device be a balanced unit in operation. In the preferred embodiment illustrated in the drawings, the opening 5 for mounting the support member 4 is substantially centrally located to distribute the weight of the device equally on either side of the spindle shaft 1. In addition, the slots 7 are spaced substantially equidistant from the spindle shaft 1. As illustrated, the number of raking teeth 9 on either side of the spindle shaft 1, are equal in weight and number.

The raking teeth 9 are comprised of strong, resilient material to withstand the flexing occasioned when the device is in operation. A single length of spring steel wire may be conveniently fashioned to form the raking teeth 9.

In operation, the device is mounted on the spindle shaft 1 and adjusted to locate the lower tips of the tooth members 11 at the lawn soil surface. The majority of rotary power mowers have adjustment means whereby the chassis 2 may be lowered or raised in relation to the wheel axles.

Power is supplied to the spindle shaft 1 and the support member 4 is rotated thereby. The raking teeth 9 trace a series of advancing circular paths as the mower A moves forward. The lower tips of the tooth members 11 pass through the matted dead grass on the lawn surface and dislodge it, leaving it ready for each collection.

The stresses exerted on the tooth member 11, as it passes through the grass and encounters obstructions are at least partially absorbed by the coil member 10.

The invention provides a useful attachment for use with rotary power mowers, which may be manufactured at low cost.

It is to be understood that the forms of the invention herein shown and described are to be taken as preferred examples and that various changes in the shape, size and arrangement of the parts may be resorted to without departing from the spirit of the invention or the scope of the appended claims.

What is claimed is:

1. A method of dislodging dead grass from a lawn which comprises the steps of:
   providing a frame with ground contacting members establishing ground contacting points;
   positioning a downwardly extending single point tine having lowermost tips at each end of a rotatable support;
   maintaining the lowermost tips of each tine in or above a plane formed by said ground contacting points;
   rotating the support in a horizontal plane; and,
   moving the center of rotation of said rotating support over the surface of the lawn with the tips tracing a helical path immediately adjacent the surface of the soil to substantially avoid any detrimental amount of overlap of the tine traces in the movement thereof over the lawn surface.

2. The method of claim 1 wherein the tines are positioned on the support and the movement of the support is such that the tines trace a helical path of the same diameter.

3. The method of claim 1 wherein the tines are positioned on the support and the movement thereof is such that the tines trace helical paths of two different diameters.

* * * * *